(12) United States Patent
English et al.

(10) Patent No.: US 10,461,607 B2
(45) Date of Patent: Oct. 29, 2019

(54) SYSTEM FOR LIQUID COOLING FOR A PUMP MOTOR

(71) Applicant: Regal Beloit America, Inc., Beloit, WI (US)

(72) Inventors: Stephen Thomas English, Englewood, OH (US); Marc C. McKinzie, West Milton, OH (US); Steven Michael Kruzel, Dayton, OH (US)

(73) Assignee: Regal Beloit America, Inc., Beloit, WI (US)

( * ) Notice: Subject to any disclaimer, the term of this patent is extended or adjusted under 35 U.S.C. 154(b) by 842 days.

(21) Appl. No.: 14/534,364

(22) Filed: Nov. 6, 2014

(65) Prior Publication Data

US 2016/0134176 A1    May 12, 2016

(51) Int. Cl.
*H02K 9/19* (2006.01)
*H02K 5/20* (2006.01)

(52) U.S. Cl.
CPC ............ *H02K 9/19* (2013.01); *H02K 5/20* (2013.01)

(58) Field of Classification Search
CPC . H02K 9/00–9/28; H02K 11/00–11/40; H02K 5/20
USPC .................. 310/52–65, 68 A–68 D, 68 R
See application file for complete search history.

(56) References Cited

U.S. PATENT DOCUMENTS

| | | |
|---|---|---|
| 3,960,467 A | 6/1976 | Zsuppan |
| 4,580,951 A | 4/1986 | Carleton et al. |
| 4,854,373 A * | 8/1989 | Williams .............. F04D 29/588 165/169 |
| 5,222,874 A | 6/1993 | Unnewehr et al. |
| 5,256,038 A | 10/1993 | Fairman |
| 5,378,121 A | 1/1995 | Hackett |
| 5,549,447 A | 8/1996 | Bevington |
| 5,939,808 A * | 8/1999 | Adames ................... H02K 9/19 310/54 |
| 5,949,171 A | 9/1999 | Horski et al. |
| 5,997,261 A | 12/1999 | Kershaw et al. |
| 6,278,203 B1 | 8/2001 | Novak et al. |
| 7,188,669 B2 | 3/2007 | Bullock et al. |
| 7,264,449 B1 | 9/2007 | Harned et al. |
| 7,334,422 B2 | 2/2008 | Zywiak et al. |
| 7,802,614 B2 | 9/2010 | Elnar |

(Continued)

FOREIGN PATENT DOCUMENTS

JP        11164521 A * 6/1999

OTHER PUBLICATIONS

Machine Translation, Nakahama, Jun. 1999. (Year: 1999).*
Examination Report No. 1 for Australian Application No. 2015252129 dated Jul. 20, 2018, 4 pages.

*Primary Examiner* — Thomas Truong
(74) *Attorney, Agent, or Firm* — Armstrong Teasdale LLP

(57) ABSTRACT

A system for liquid cooling for a motor for a pump is provided. The system includes a motor configured to be coupled to a pump to move a liquid from an inlet side of the pump associated with a first pressure to an outlet side of the pump associated with a second pressure that is greater than the first pressure. The system additionally includes a heat transfer tube adjacent to at least a portion of the motor. The heat transfer tube is configured to receive at least a portion of the liquid from the outlet side of the pump and transfer heat away from said motor using the liquid.

11 Claims, 4 Drawing Sheets

(56) References Cited

U.S. PATENT DOCUMENTS

| | | | |
|---|---|---|---|
| 2010/0178175 A1* | 7/2010 | Koyama | F04C 18/0215 417/12 |
| 2012/0112573 A1* | 5/2012 | Chamberlin | H02K 9/19 310/59 |
| 2012/0269660 A1* | 10/2012 | Yin | F04B 47/06 417/410.1 |
| 2014/0054979 A1* | 2/2014 | Sugita | H02K 9/20 310/12.29 |
| 2014/0154102 A1* | 6/2014 | Tecza | F04D 17/12 417/53 |

\* cited by examiner

SYSTEM FOR LIQUID COOLING FOR A PUMP MOTOR

BACKGROUND

The field of the disclosure relates generally to cooling a motor with liquid, and more particularly, to cooling a motor for a pump using liquid moved by the pump.

At least some known devices move a fluid through or against a component that generates heat to transfer the heat away from the component and prevent the component from overheating and failing. For example, in many known systems, a fan directs air through or against a motor to transfer heat away from the motor. Other systems direct a liquid such as water in a loop that passes through or against one or more components, for example in a liquid-cooled computing device. Such systems require a dedicated device, such as a dedicated fan or pump, to move the fluid through or against the component to transfer the heat away. As a result, such cooling systems generate acoustic noise beyond any acoustic noise generated by the heat-generating components themselves. Additionally, such cooling systems require additional energy beyond the energy used by the heat-generating components. Further, such cooling systems require added expense to manufacture and install the dedicated fan or pump designed to move the fluid through or against the heat-generating component.

BRIEF DESCRIPTION

In one aspect, a system for liquid cooling for a motor for a pump is provided. The system includes a motor configured to be coupled to a pump to move a liquid from an inlet side of the pump associated with a first pressure to an outlet side of the pump associated with a second pressure that is greater than the first pressure. The system additionally includes a heat transfer tube adjacent to at least a portion of the motor. The heat transfer tube is configured to receive at least a portion of the liquid from the outlet side of the pump and transfer heat away from said motor using the liquid.

In another aspect, a method of making a system for liquid cooling for a motor for a pump is provided. The method includes coupling a motor to a pump to move a liquid from an inlet side of the pump associated with a first pressure to an outlet side of the pump associated with a second pressure that is greater than the first pressure. The method additionally includes positioning a heat transfer tube adjacent to at least a portion of the motor. Additionally, the method includes configuring the heat transfer tube to receive at least a portion of the liquid from the outlet side of the pump and transfer heat away from the motor using the liquid.

In another aspect, a system for detecting at least one property of a liquid used to cool a motor is provided. The system includes a motor and a heat transfer tube positioned adjacent to at least a portion of the motor. The heat transfer tube is configured to transfer heat away from the motor using the liquid. Additionally, the system includes at least one sensor that is at least partially located within the heat transfer tube. The at least one sensor is configured to detect at least one property of the liquid in said heat transfer tube.

In another aspect, a system that includes a motor is provided. The motor includes a plurality of components. At least one component of the motor is enveloped in a dielectric fluid that distributes heat generated by the motor throughout the dielectric fluid.

DETAILED DESCRIPTION

Implementations of the system described herein cool a motor using liquid that is being pumped by a pump that is driven by the motor. More specifically, implementations of the system direct a portion of the liquid being pumped by a pump for a pool, spa, or other liquid container through a heat transfer tube that is adjacent to at least a portion of the motor. A liquid movement device, such as an impeller, in the pump generates a relatively low pressure on an inlet side of the pump and generates a relatively high pressure on an outlet side of the pump. The heat transfer tube receives a portion of the liquid from the outlet side of the pump and carries the liquid against the motor, then expels the liquid back into the pump or directly back into the pool, spa, or other liquid container. Accordingly, the system enables the pump to serve a dual purpose of (i) moving liquid for the pool, spa, or other liquid container and (ii) cooling the motor. Additionally, in at least some implementations, a motor controller coupled to the motor receives an indication signal representing at least one property of the liquid. The sensor is located at least partially in the heat transfer tube. The sensor detects at least one property of the liquid in the heat transfer tube and transmits the indication signal to the motor controller. Additional features of the system are described in more detail herein.

In one implementation, a computer program is described, and the program is embodied on a computer-readable medium. In an example implementation, the computer program is executed on a single computing device, without requiring a connection to a server computer. The computer program is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Figure 1:
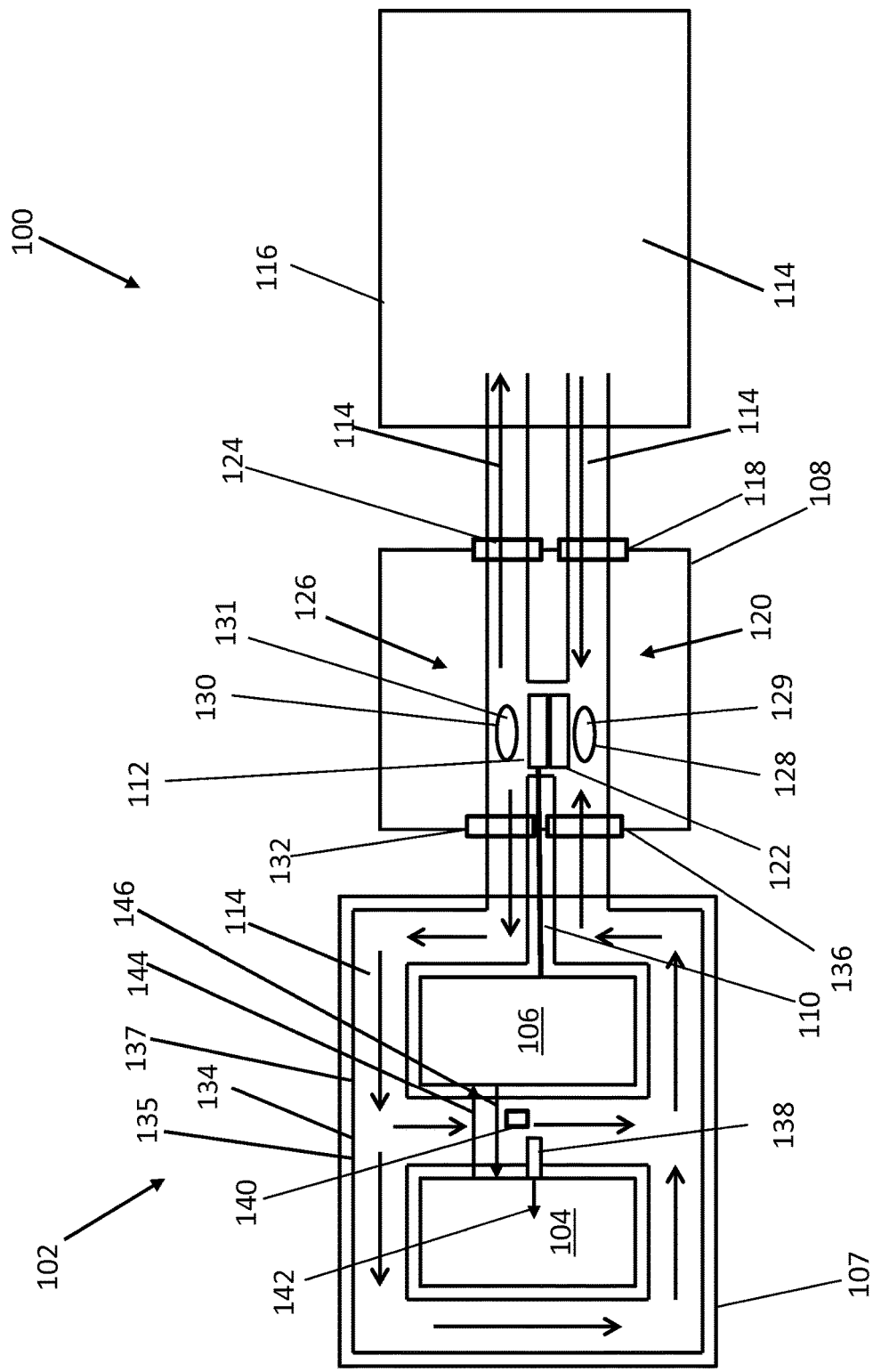
FIG. 1 is a block diagram of an example environment in which a system for liquid cooling for a motor for a pump operates.

FIG. 1 is a block diagram of an example environment 100 in which a system 102 for liquid cooling for a motor 106 for a pump 108 operates. System 102 includes a motor controller 104 that is communicatively coupled to motor 106. Motor 106 is, for example, an electric motor. In some implementations, motor 106 is a variable speed motor, such as an electronically commutated motor (ECM). A housing 107 encloses both motor controller 104 and motor 106. In other implementations, housing 107 encloses only one of, or only a portion of one of, motor controller 104 and motor 106. Motor 106 is coupled to pump 108 by a shaft 110. More specifically, motor 106 rotates shaft which causes a liquid movement device 112 in pump 108, for example an impeller, to move a liquid 114 (e.g., water). Liquid movement device 112 receives liquid 114 from a liquid container 116 (e.g., a pool or spa) into an inlet 118 located in an inlet side 120 of pump. Further, liquid movement device 112 directs liquid 114 through a filter 122 and through liquid movement device 112, and expels liquid 114 out of pump 108 through an outlet 124 located in an outlet side 126 of pump 108. More specifically, liquid movement device 112 generates a first region 128 having a first pressure 129, such as a relatively low pressure, at the inlet side 120 of pump 108 that draws liquid 114 into inlet 118, and generates a second region 130 having a second pressure 131, such as a relatively high pressure, at the outlet side 126 that forces liquid 114 out through outlet 124.

Pump 108 additionally includes a first port 132 that is coupled to a heat transfer tube 134. First port 132 is located on outlet side 126 of pump 108. A portion of liquid 114 from second region 130 is forced through first port 132 and into heat transfer tube 134 by the relatively high pressure (e.g., second pressure 131) in second region 130. The amount of liquid 114 that passes through first port 132 rather than being expelled through outlet 124 is relatively small. For example, in some implementations, 10% or less of liquid 114 moved by pump 108 passes through first port 132 rather than being expelled through outlet 124.

Heat transfer tube 134 directs liquid 114 between motor controller 104 and motor 106 and transports liquid 114 to a second port 136. In some implementations, heat transfer tube 134 includes one or more channels 135 formed in a material of housing 107. For example, in some implementations, channels 135 are gas assist created channels generated during the manufacture of housing 107. In some implementations, housing 107 includes a plastic resin and in other implementations, housing 107 includes at least one metal. In some implementations, heat transfer tube 134 includes at least one metal 137 with a relatively high level of heat conductivity, such as copper. In some implementations, such as in FIG. 1, second port 136 is coupled to pump 108 at inlet side 120 and liquid 114 travels through filter 122 and liquid movement device 112 again, where it mixes with additional liquid 114 that has been drawn in from liquid container 116 through inlet 118. In some implementations, heat transfer tube 134 expels liquid 114 into environment 100, for example into liquid container 116. In some implementations, heat transfer tube 134 is adjacent to motor 106. In some implementations, heat transfer tube 134 encloses at least a portion of motor 106. In some implementations, heat transfer tube 134 encloses at least a portion of motor controller 104. In some implementations, heat transfer tube 134 encloses both motor controller 104 and motor 106, for example as shown in FIG. 1.

A sensor 138 is communicatively coupled to motor controller 104. Sensor is configured to detect at least one property 140 of liquid 114 and transmit an indication signal 142 representing property 140 to motor controller 104. More specifically, in some implementations, sensor 138 is configured to detect at least one of a temperature, a pH, a turbidity, a salinity, and a level of chlorine in liquid 114. Motor controller 104 transmits at least one instruction signal 144 to motor 106 for controlling an operation of motor 106. In some implementations, motor controller 104 receives at least one feedback signal 146 from motor 106 that represents an operating status or other information regarding motor 106. In some implementations, after receiving indication signal 142 from sensor 138, motor controller 104 transmits instruction signal 144 to change the operation of motor 106. For example, in some implementations, motor controller 104 determines that a level of turbidity represented by indication signal 142 is above a threshold level stored in memory, and transmits instruction signal 144 to motor 106 to continue operation beyond a prescheduled deactivation time to reduce the level of turbidity in liquid 114.

Figure 2:
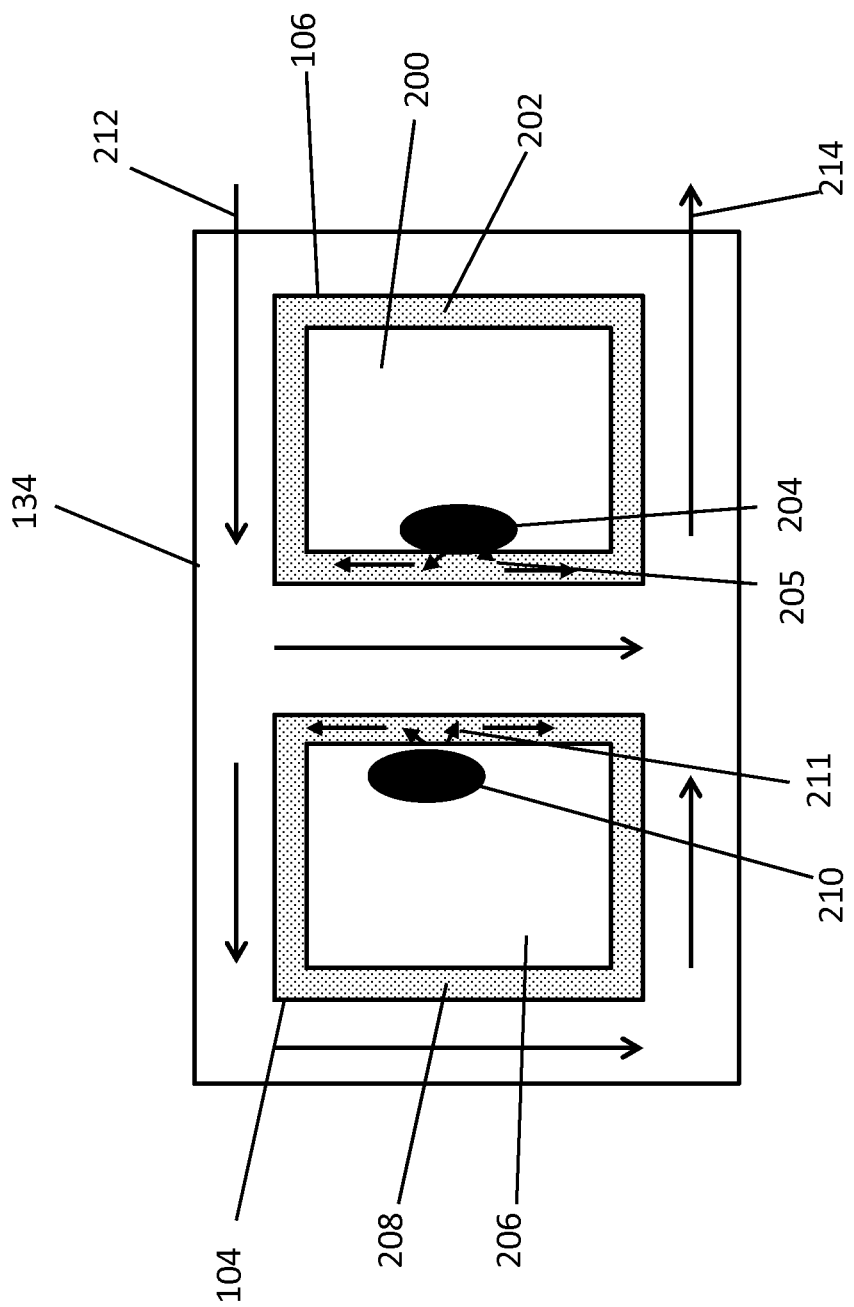
FIG. 2 is a block diagram of the motor and a motor controller included in the system of FIG. 1.

FIG. 2 is a block diagram of motor 106 and motor controller 104 in system 102. Motor 106 includes one or more components 200 (e.g., a stator and a rotor) that are enveloped in a first dielectric fluid 202. In some implementations, first dielectric fluid 202 is oil. First dielectric fluid 202 distributes first heat 205 emanating from a first zone 204 of relatively high temperature throughout first dielectric fluid 202. Similarly, motor controller 104 includes one or more components 206 that are enveloped in a second dielectric fluid 208. In some implementations, second dielectric fluid 208 is the same dielectric fluid as first dielectric fluid 202. Second dielectric fluid 208 distributes second heat 211 emanating from a second zone 210 of relatively high temperature throughout second dielectric fluid 208.

Heat transfer tube 134 transports a relatively cool flow 212 of liquid 114 past and between motor 106 and motor controller 104 and transports a resulting relatively hot flow 214 of liquid 114 away from motor 106 and motor controller 104. Heat transfer tube 134 directs relatively hot flow 214 back to pump 108 where at least a portion of relatively hot flow 214 is expelled into liquid container 116. Accordingly, by transferring heat (e.g., first heat 205 and/or second heat 211) to liquid container 116, system 102 reduces an amount of energy a heating device (not shown), such as a spa heater or a pool heater, must expend to heat liquid 114 in liquid container 116 to a target temperature. While heat transfer tube 134 is shown wrapping around each of motor controller 104 and motor 106, in other implementations, heat transfer tube 134 is adjacent to only a portion of motor controller 104 and/or motor 106. Accordingly, even if heat transfer tube 134 is not adjacent to a particular zone (e.g., first zone 204 or second zone 210) that is hotter than other portions of motor controller 104 and/or motor 106, first dielectric fluid 202 and second dielectric fluid 208 distribute the heat to the portion of heat transfer tube 134 that is adjacent to motor controller 104 and/or motor 106.

In some implementations, housing 107 at least partially encloses motor 106 and heat transfer tube 134 includes at least one channel (e.g., channel 135) defined in housing 107. In some implementations, heat transfer tube 134 includes a copper tube (e.g., metal 137). In some implementations, heat transfer tube 134 is configured to expel liquid 114 to inlet side 120 of pump 108. In some implementations, pump 108 receives liquid 114 from an aquatic environment (e.g., environment 100), and heat transfer tube 134 is further configured to expel liquid 114 to the aquatic environment (e.g., environment 100). More specifically, in some implementations, heat transfer tube 134 expels liquid 114 into liquid container 116 (e.g., a pool or spa).

Figure 3:
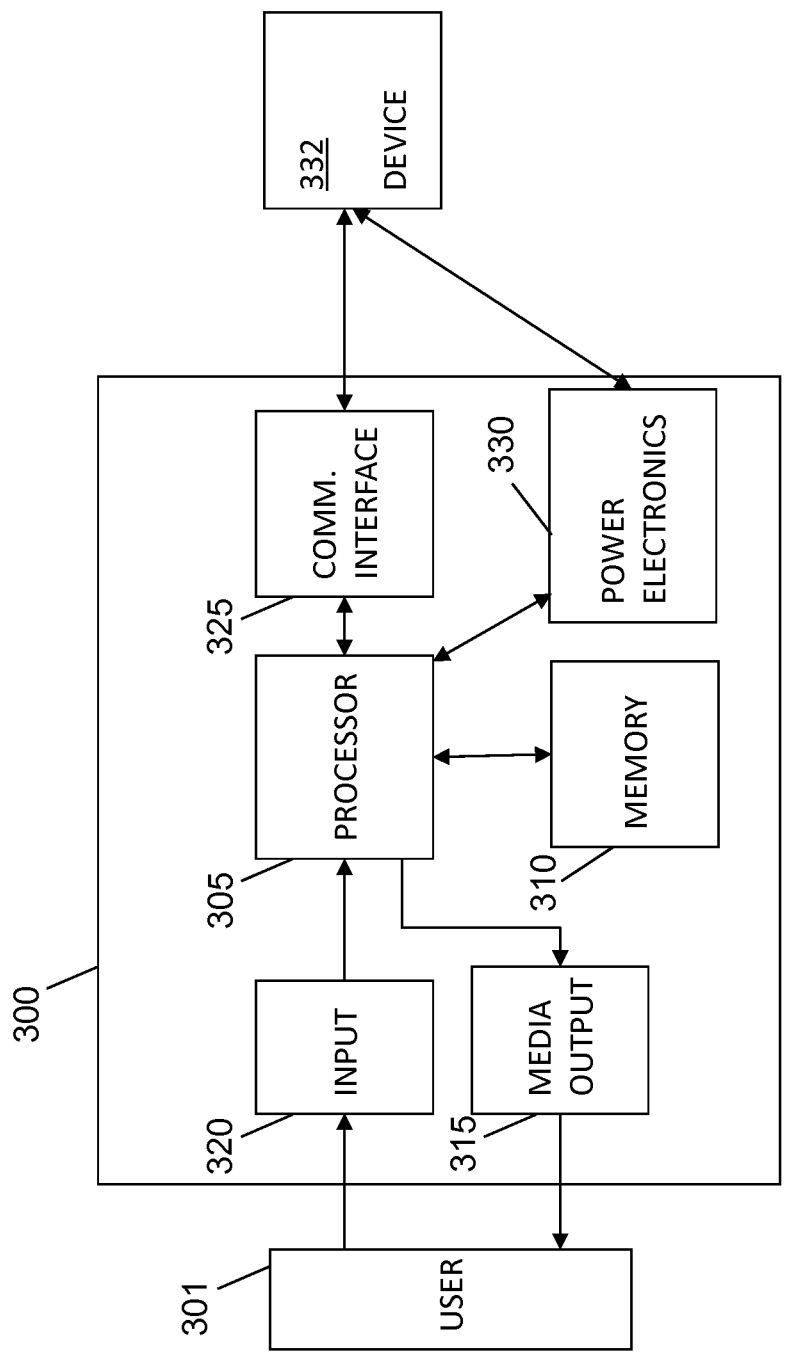
FIG. 3 is a block diagram of an example computing device included in the system of FIG. 1.

FIG. 3 is a block diagram of an example computing device 300. At least some components of computing device 300 are included in implementations of other devices describe herein, for example motor controller 104 and/or sensor 138. Computing device 300 includes a processor 305 for executing instructions. In some implementations, executable instructions are stored in a memory area 310. Processor 305 may include one or more processing units (e.g., in a multi-core configuration). Memory area 310 is any device allowing information such as executable instructions and/or other data to be stored and retrieved. Memory area 310 may include one or more computer-readable media.

In some implementations, computing device 300 also includes at least one media output component 315 for presenting information to user 301. Media output component 315 is any component capable of conveying information to user 301. In some implementations, media output component 315 includes an output adapter such as a video adapter and/or an audio adapter. An output adapter is operatively coupled to processor 305 and operatively couplable to an output device such as a display device (e.g., a liquid crystal display (LCD), one or more light emitting diodes (LED), an organic light emitting diode (OLED) display, cathode ray tube (CRT), or "electronic ink" display) or an audio output device (e.g., a speaker or headphones).

In some implementations, computing device 300 includes an input device 320 for receiving input from user 301. Input device 320 may include, for example, one or more buttons, a keypad, a touch sensitive panel (e.g., a touch pad or a touch screen), and/or a microphone. A single component such as a touch screen may function as both an output device of media output component 315 and input device 320.

Computing device 300 may also include a communication interface 325, which is communicatively couplable to another device 332, for example motor 106 or another computing device. In some implementations, communication interface 325 is configured to enable communication through a short range wireless communication protocol such as Bluetooth™ or Z-Wave™, through a wireless local area network (WLAN) implemented pursuant to an IEEE (Institute of Electrical and Electronics Engineers) 802.11 standard (i.e., WiFi), and/or through a mobile phone (i.e., cellular) network (e.g., Global System for Mobile communications (GSM), 3G, 4G) or other mobile data network (e.g., Worldwide Interoperability for Microwave Access (WIMAX)), or a wired connection (i.e., one or more conductors for transmitting electrical signals). In some implementations, communication interface 325 includes, for example, one or more conductors for transmitting electrical signals and/or power to and/or from another device 332. Additionally, computing device 300 may also include power electronics 330 which may be coupled, for example, to processor 305 and motor 106.

Figure 4:
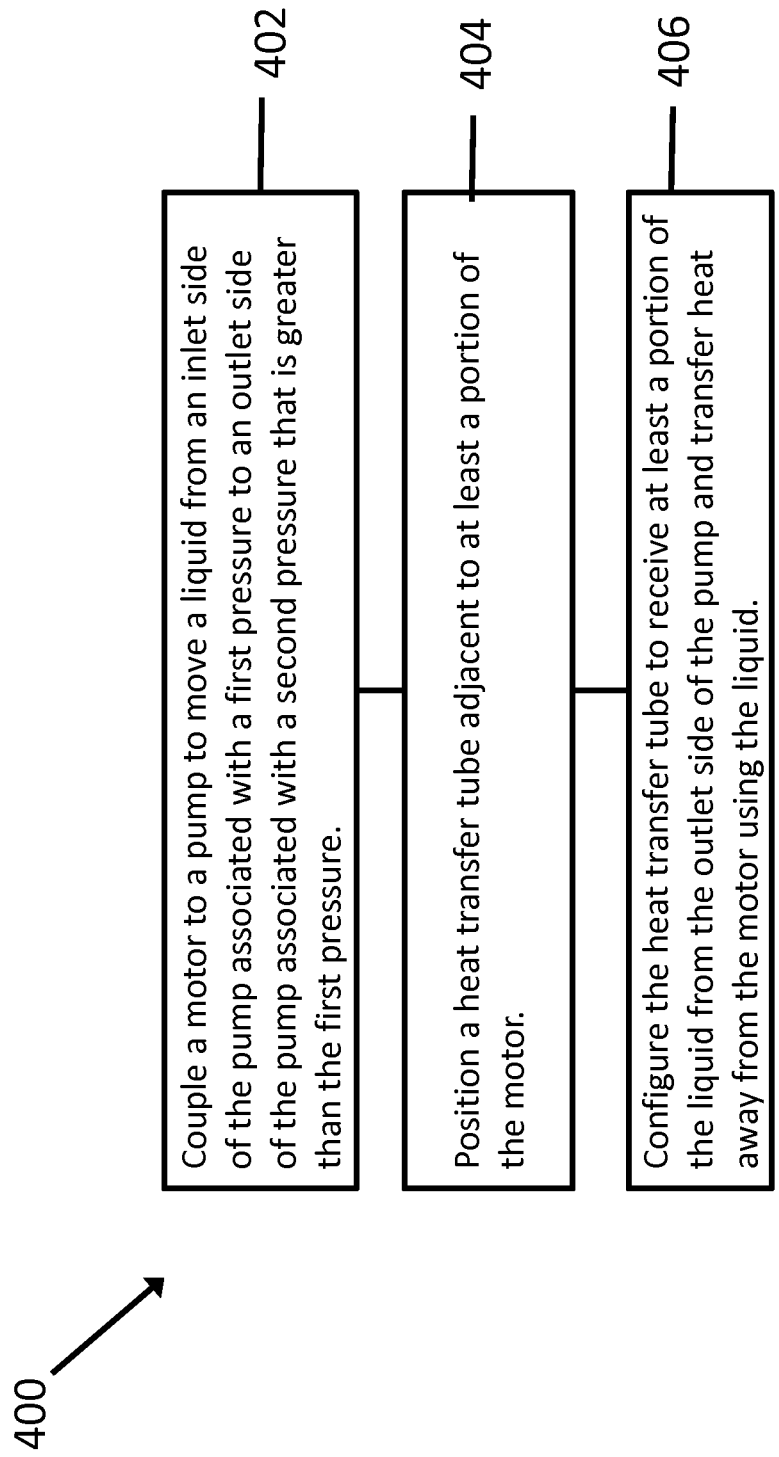
FIG. 4 is a flow chart of an example process for making a system for liquid cooling in a motor for a pump.

FIG. 4 is a flow chart of an example process 400 for making a system (e.g., system 102) for liquid cooling for a motor (e.g., motor 106) for a pump (e.g., pump 108). Initially, process 400 includes coupling 402 a motor (e.g., motor 106) to a pump (e.g., pump 108) to move a liquid (e.g., liquid 114) from an inlet side (e.g., inlet side 120) of the pump (e.g., pump 108) associated with a first pressure (e.g., first pressure 129) to an outlet side (e.g., outlet side 126) of the pump (e.g., pump 108) associated with a second pressure (e.g., second pressure 131) that is greater than the first pressure (e.g., first pressure 129).

Additionally, process 400 includes positioning 404 a heat transfer tube (e.g., heat transfer tube 134) adjacent to at least a portion of the motor (e.g., motor 106). Additionally, process 400 includes configuring 406 the heat transfer tube (e.g., heat transfer tube 134) to receive at least a portion of the liquid (e.g., liquid 114) from the outlet side (e.g., outlet side 126) of the pump (e.g., pump 108) and transfer heat (e.g., first heat 205) away from the motor (e.g., motor 106) using the liquid (e.g., liquid 114).

In some implementations process 400 additionally includes forming the heat transfer tube (e.g., heat transfer tube 134) as a channel (e.g., channel 135) in a housing (e.g., housing 107) that is configured to at least partially enclose the motor (e.g., motor 106). For example, in some implementations, forming heat transfer tube 134 includes forming one or more gas assist created channels (e.g., channels 135) in the housing (e.g., housing 107). In some implementations, process 400 includes forming heat transfer tube (e.g., heat transfer tube 134) from a metal, such as copper (e.g., metal 137). In some implementations, process 400 additionally includes positioning the heat transfer tube (e.g., heat transfer tube 134) between the motor (e.g., motor 106) and a motor controller (e.g., motor controller 104). In some implementations, process 400 includes coupling a sensor (e.g., sensor 138) to the motor controller (e.g., motor controller 104) and positioning the sensor (e.g., sensor 138) to be at least partially inside the heat transfer tube (e.g., heat transfer tube 134). In some implementations, process 400 additionally includes enveloping at least one component (e.g., components 200) of the motor (e.g., motor 106) in a dielectric fluid (e.g., first dielectric fluid 202). In some implementations, process 400 additionally includes enveloping at least one component (e.g., components 206) of the motor controller (e.g., motor controller 104) in a dielectric fluid (e.g., second dielectric fluid 208). In some implementations, process 400 includes configuring the heat transfer tube (e.g., heat transfer tube 134) to expel the liquid (e.g., liquid 114) to the inlet side (e.g., inlet side 120) of the pump (e.g., pump 108), for example through second port 136. In other implementations, process 400 includes configuring the heat transfer tube (e.g., heat transfer tube 134) to expel the liquid (e.g., liquid 114) directly into a liquid container (e.g., liquid container 116).

The methods and systems described herein may be implemented using computer programming or engineering techniques including computer software, firmware, hardware or any combination or subset thereof, wherein the technical effect may include at least one of: (a) receiving an indication of the at least one property from at least one sensor, and (b) changing an operation of a motor based on the indication. More specifically, as described above, motor controller 106 may be programmed to perform at least the above steps.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 305, including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

As compared to known systems and methods for cooling a heat-generating component with a liquid, the systems described herein reduce the amount of noise, energy, and cost associated with liquid-cooling systems. More specifically, the systems described herein enable a motor and/or controller to be cooled by liquid that is already being pumped by a pump that is driven by the motor, rather than requiring a dedicated liquid movement device for cooling the motor and/or motor controller. Additionally, the systems described herein reduce the amount of energy that must be used by any pool heaters or spa heaters because at least some implementations of the system described herein transfer heat away from the motor and/or motor controller and direct the heat into the spa or pool.

Exemplary embodiments of systems and methods for liquid cooling for a motor for a pump are described herein. The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for liquid cooling for a motor for a pump, said system comprising:

a motor configured to be coupled to a pump to move a liquid from an inlet side of the pump associated with a first pressure to an outlet side of the pump associated with a second pressure that is greater than the first pressure, said motor comprising a motor housing that encloses internal components of said motor, said motor housing comprising an inner surface oriented toward the internal components of said motor and an outer surface that defines an exterior of said motor;

a motor controller coupled to said motor within said motor housing and configured to control operation of said motor; and a heat transfer tube positioned internally within said motor housing adjacent to at least a portion of the internal components of said motor and enclosing said motor controller, wherein said heat transfer tube comprises at least one channel extending from the inner surface to the outer surface of said housing, wherein said channel is configured to couple to a first port of the pump and receive at least a portion of the liquid from the outlet side of the pump via the first port and transfer heat away from said motor and said motor controller using the liquid.

2. The system of claim 1, wherein said heat transfer tube further comprises a copper tube.

3. The system of claim 1, wherein said channel is further configured to expel the liquid to the inlet side of the pump.

4. The system of claim 1, wherein the pump receives the liquid from an aquatic environment, and said channel is further configured to expel the liquid to the aquatic environment.

5. The system of claim 1, wherein said motor comprises at least one component enveloped in a dielectric fluid.

6. The system of claim 1, wherein said motor controller comprises at least one component enveloped in a dielectric fluid.

7. The system of claim 1, further comprising:

at least one sensor communicatively coupled to said motor controller, wherein said at least one sensor is configured to detect at least one property of the liquid in said channel.

8. The system of claim 7, wherein said at least one sensor is configured to detect at least one of a temperature, a pH, a turbidity, a salinity, or a level of chlorine in the liquid.

9. The system of claim 7, wherein said motor controller is configured to:

receive an indication of the at least one property from said at least one sensor; and change an operation of said motor based on the indication.

10. The system of claim 1, further comprising the pump and said pump comprises the first port configured to couple to said heat transfer tube and direct the liquid into said channel.

11. The system of claim 10, wherein said pump further comprises a second port configured to couple to said heat transfer tube and receive the liquid from said channel.

* * * * *